Sept. 21, 1926.
N. AMNEUS
BELT GUARD
Filed March 8, 1922
1,600,208
3 Sheets-Sheet 1
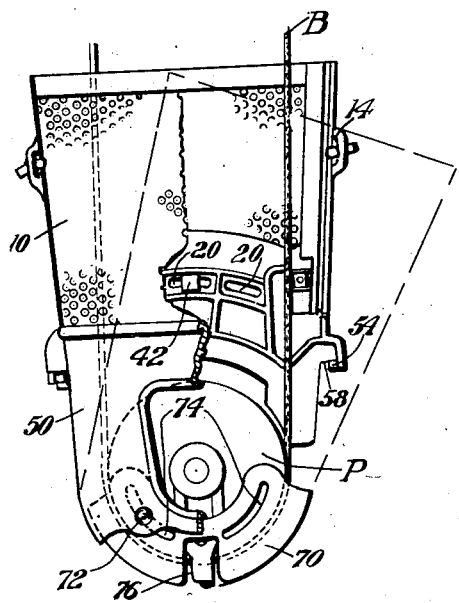
Fig. 1.
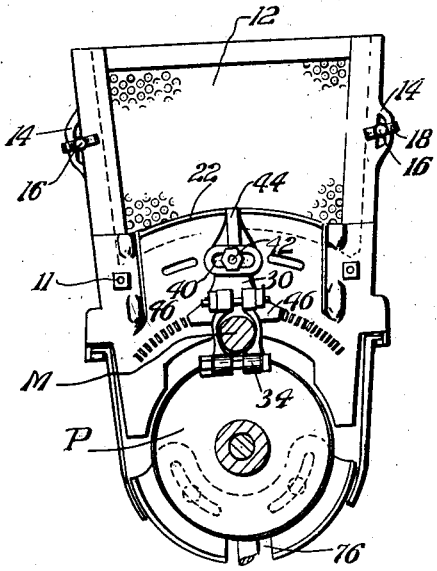
Fig. 2.
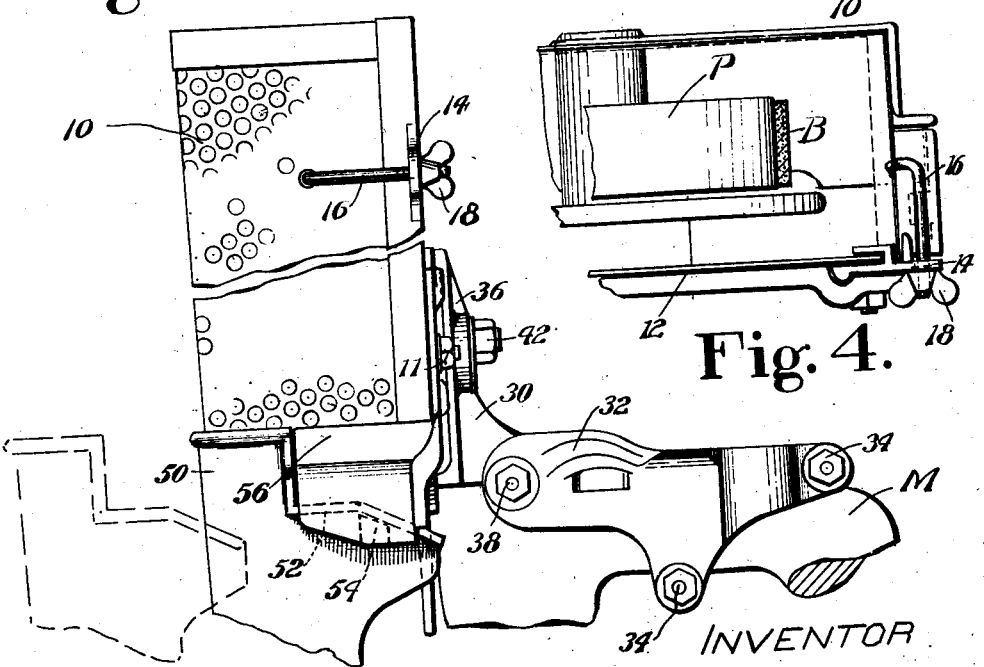
Fig. 3.
Fig. 4.
INVENTOR
Nils Amneus
By his Attorney
Nelson W. Howard Sept. 21, 1926.

N. AMNEUS 1,600,208

BELT GUARD

Filed March 8, 1922

INVENTOR

Sept. 21, 1926. 1,600,208
N. AMNEUS
BELT GUARD
Filed March 8, 1922   3 Sheets-Sheet 3

INVENTOR
Nils Amneus
By his Attorney
Nelson M. Howard

Patented Sept. 21, 1926.

1,600,208

UNITED STATES PATENT OFFICE.

NILS AMNEUS, OF POINT LOMA, CALIFORNIA, ASSIGNOR TO UNITED SHOE MACHINERY CORPORATION, OF PATERSON, NEW JERSEY, A CORPORATION OF NEW JERSEY.

BELT GUARD.

Application filed March 8, 1922. Serial No. 541,972.

This invention relates to the protection of workment and others from the moving parts of machines and is illustrated as embodied in a belt and pulley guard.

It has long been recognized as desirable that belts, pulleys and other similar moving parts of machines should be covered as far as possible by guards to prevent injury to workmen and others, and in some States the statutes require various kinds of pulleys and belts to be protected by such guards. It has been the usual custom to design a protective device or guard for each machine and in some cases different guards have been provided for various inclinations of the belt on a single machine. It is an object of this invention to improve such protective devices by providing a guard which can readily be adapted to various types of machines and which can be adjusted according to the inclination of the belt. A further object of the invention is to lessen the number of different guards which must be carried in stock for a line of machines by providing for adapting a single type of stock guard to a variety of machines.

In one aspect the invention comprises a novel belt and pulley guard having a protective enclosure for the pulley and part of the belt, a support for the enclosure constructed and arranged to be clamped to the frame of a machine carrying the pulley, and a bolt and slot connection between the enclosure and the support arranged to permit angular adjustment of the enclosure about the axis of the pulley according to the inclination of the belt. By this arrangement it is possible to fit the stationary part of the guard according to the shape and arrangement of the parts of the machine closely adjacent to the pulley, since it is not moved relatively to such parts during the angular adjustment of the remainder of the guard.

A further feature of the invention is to be found in a novel support for the improved guard, which comprises clamping means to be secured to a fixed part of a machine and fastening means to be secured to the guard itself while permitting adjustment about the axis of the pulley to accommodate various inclinations of a belt. In an illustrated form of the invention this fastening means comprises a bolt which passes through the support and through a slot in the guard which has the form of an arc about the axis of the pulley as a center.

Preferably the support is provided with several spaced feet, which engage the guard about the bolt which secures it to the support, to provide a firm contact between the support and the guard with a minimum amount of surface which must be machined.

In machines of some types it is necessary to provide for frequent access to the pulley or to parts of the machine immediately adjacent the pulley and in order to facilitate such access to these my invention contemplates making the lower part of the guard in the form of a readily detachable draw member covering the pulley and supported by the upper or belt enclosing portion. In the illustrated form this draw member is supported by means of ledges formed on the draw member and arranged to slide on lugs formed on the upper portion of the guard.

In another aspect my invention provides for fitting one stock form of guard to a variety of machines according to a novel method, which contemplates making up quantities of guards for stock in two or more pieces as above described; then adapting some of them for a particular type of machine by cutting or otherwise shaping one of the pieces of each guard to fit it to the parts of that type of machine immediately adjacent to the pulley so that said piece will bear a predetermined fixed relation with respect to the perpendicular in different individual machines of said type; and then adapting a single one of the fitted guards to an individual machine of that type after the machine has been installed in a factory, by adjusting the other part of the guard angularly relatively to the fitted part, according to the inclination of belt arranged to drive that particular machine as installed in that factory. This arrangement makes it possible to provide a limited number of stock guards for an entire line of machines such, for example, as shoe machinery. By constructing the guard in this improved manner, it is only necessary to provide a few different sizes to accommodate the variations in the sizes of the pulleys, as the one style of guard can readily be adapted to any type of machine according to the above-described method.

Further features of my invention are to be found in improved means for clamping together the back and front parts of the guard and in various other combinations and details of construction which will be apparent from the following description of several modifications of my improved guard shown in the accompanying drawings, in which—

Fig. 1 is a front elevation, partly broken away, showing a guard enclosing a pulley and part of a belt;

Fig. 2 is a rear elevation;

Fig. 3 is a partial side elevation thereof;

Fig. 4 is a partial top plan view of the guard shown in Figs. 1 to 3;

Figure 5:
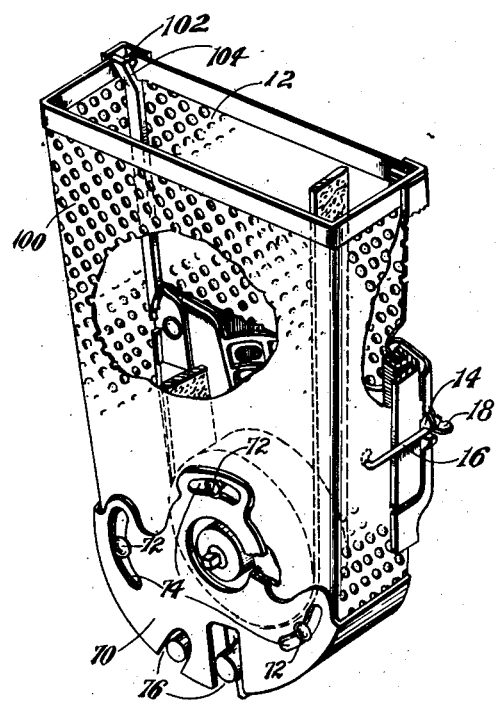
Figs. 5 and 6 are perspectives of a modified form of guard.

The guard shown in Figs. 1 to 4 inclusive comprises a front member 10 and a rear member 12, which may be made of perforated or expanded metal reinforced at the edges as shown. For convenience of manufacture the rear member 12 may be made in two pieces fastened together by bolts 11. The rear member 12 has ears 14 formed on the opposite sides through which pass clamping bolts 16 having heads which engage the front member 10 as shown in Fig. 4, and which are held in the ears 14 by means of butterfly nuts 18. Formed in the rear member 12 is a slot or a series of slots 20 on an arc formed about a center in the axis of the pulley P.

Member 12, to which is secured as above described the front member 10, is held by a support indicated generally at 30. The support 30 comprises a member 32 formed to embrace fixed part M of the machine on which the guard is mounted and to which it is clamped by clamp screws 34, and a member 36 pivotally bolted thereto at 38. Member 36 has a slot 40 formed therein through which passes a clamping bolt 42 which passes through one of the slots 20 as far as permitted by its head. It will be observed that the position of bolt 42 in one of the slots 20 determines the angular position of members 10 and 12 with respect to the axis of the pulley P, permitting adjustment according to the inclination of belt B passing thereover. The slot 40 allows for adjustment when an inclination is desired which would otherwise bring the bolt 42 opposite the solid portion between two of the slots 20. Above the slot 40 a finger 44 is formed on member 36 which engages an arcuate ledge 22 according to the adjustment of bolt 42 in one of the slots 20. Similarly two fingers 46 are formed below the slot 40, which together with finger 44 constitute a plurality of guard supporting fingers spaced to outline a polygonal area so as to form a stable 3-point engagement between member 36 and member 12. By the pivotal mounting at 38 members 12 and 36 may be swung back out of the way without being removed from the machine when the remainder of the guard is removed for any reason.

A draw member or cover 50 shaped to guard the pulley is carried by member 12, and, in order to be readily detached therefrom to provide for access to the pulley and parts of the machine immediately adjacent thereto, it is mounted thereon by being formed with ledges 52 which slide on and are supported by lugs 54 on projecting portions 56 of the lower half of the two-piece member 12. By this arrangement it will be seen that cover 50 can easily be removed without loosening any fastenings whatever, and yet is firmly held in place by the action of gravity, which tends to slide the ledges 52 across the members 54 so as to bring the rear ends of ledges against surfaces 58 of portions 56. It will be observed that cover 50 accompanies member 12 in its angular adjustments.

The bottom part of cover 50 is cut away, and a separate member 70 is secured to the cover 50 by bolts 72 passing through arcuate slots 74. Member 70 is intended to occupy a single fixed position relatively to the perpendicular in different machines of a particular type while the remainder of the guard is angularly adjusted according to the inclination of the belt in any individual machine of said type and is fitted to the parts of said machine which are immediately adjacent to the pulley by having portions 76 cut away or otherwise shaped to accommodate parts of the machine on which the guard is to be placed. It will be observed that member 70 can be fitted to a particular machine or to a particular type of machine before the inclination of the belt is known, as the remainder of the guard is adjustable independently thereof to accommodate the belt.

The above described improved construction of the guard makes it possible to fit stock guards to machines by making up the various parts of the guard for all machines having pulleys of approximately the same size, then cutting or otherwise fitting the members 70 for machines of the various types, and then mounting single guards so fitted on individual machines by angularly adjusting members 10, 12 and 50 for each guard according to the inclination of the belt which drives or runs over the individual machine on which it is mounted, without disturbing the position of member 70 relatively to the parts of the machine to which it has been fitted.

Figure 6:
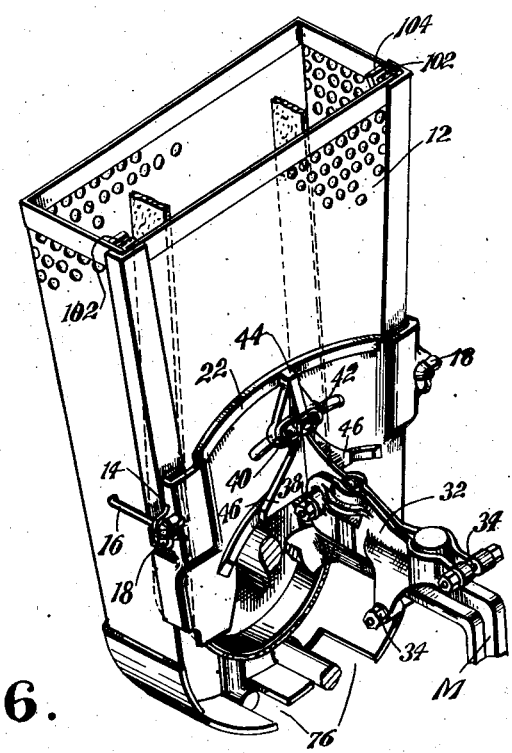

Figs. 5 and 6 illustrate a modified form of my invention which is much like the form illustrated in Figs. 1 to 4 except that members 10 and 50 have been replaced by a single front piece 100. This form of guard is especially adapted for use on machines which do not require frequent access to the pulley. These figures show, in addition to the method illustrated in Figs. 1 to 4, a modified method of securing the front and back pieces together according to which the front piece 100 carries pins 102 which seat in forks 104 at the top corners of the back piece 12.

Figures 7, 8:
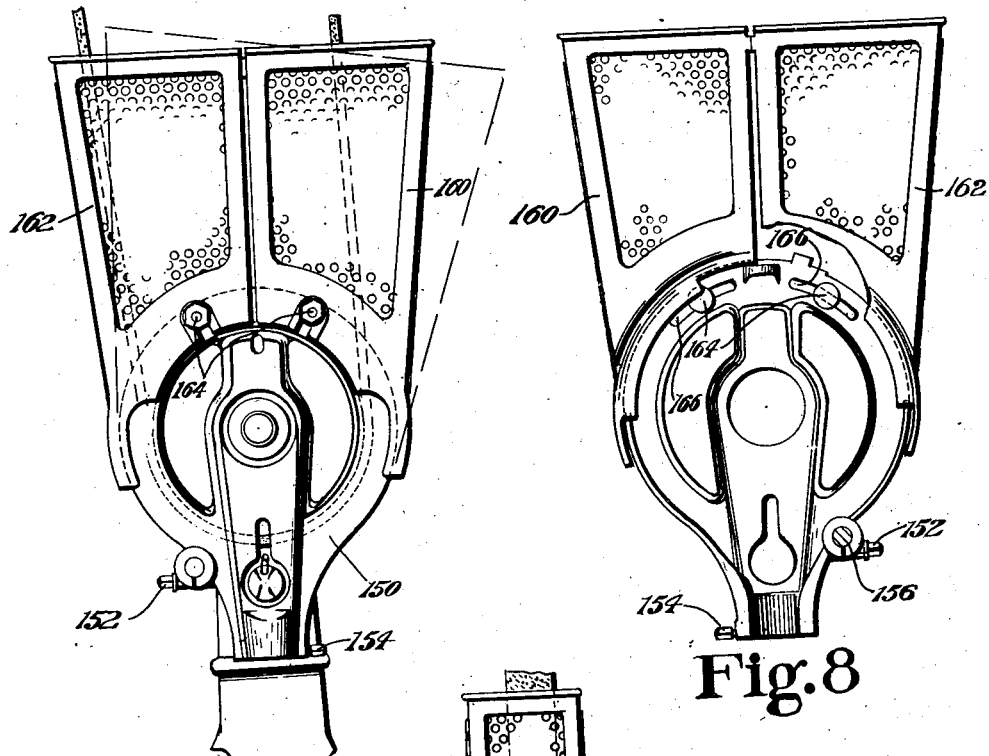
Figs. 7, 8 and 9 are respectively front, rear and side elevations of a further modified form of guard.
Figure 9:
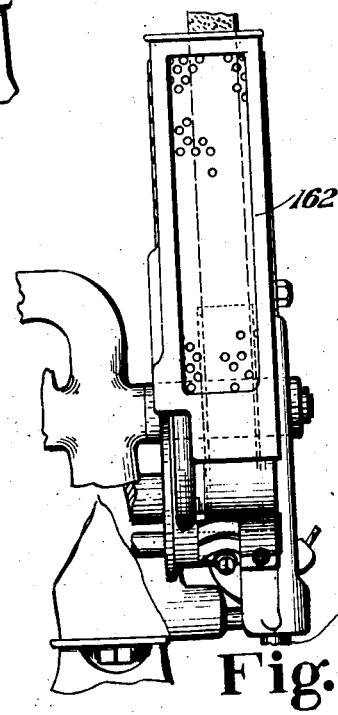

Figs. 7, 8 and 9 illustrate a modification of my invention according to which the guard comprises a pulley protecting cover 150 which is clamped by screws 152 and 154 to fixed parts 156 and 158 of the machine. Angularly adjustable belt protecting members 160 and 162 are secured to member 150 by clamping bolts 164 passing through arcuate slots 166 formed therein.

While specific forms of guards have been described, it is to be understood that this is for purposes of illustration only, it being intended that the scope of the invention be limited only as required by the terms of the appended claims.

Having described my invention, what I claim as new and desire to secure by Letters Patent of the United States is:

1. A belt and pulley guard comprising, in combination, a member formed and arranged to guard a pulley, a member to guard a belt arranged to run on said pulley, an adjustable support for the second member, a connection between the two members, and a connection between the second member and the support, said connections being constructed and arranged to permit the second member to be tilted about the axis of the pulley to adjust it according to the inclination of the belt without changing the position of the first member or the position of the support.

2. A belt and pulley guard as defined by claim 1, in which the adjustable connection is made by forming an arcuate slot in one member and passing a bolt through said slot and through the other member.

3. A belt and pulley guard comprising, in combination, a protective enclosure for the pulley and part of the belt, a support for said enclosure constructed and arranged to be clamped to the frame of a machine carrying the pulley, and a bolt-and-slot connection between the enclosure and the support arranged to permit angular adjustment of the enclosure about the axis of the pulley according to the inclination of the belt.

4. A device of the class described comprising, in combination, a belt and pulley guard having a slot in the form of an arc in one side, a member having a clamp to be fastened to a machine and a plurality of guard-supporting fingers spaced to outline a polygonal area, and a clamping bolt passing through the slot and through the support within the polygonal area to clamp the guard and support together while permitting angular adjustment about an axis passing through the center from which the arc was formed.

5. A belt and pulley guard comprising, in combination, a back piece having ears at each side, a piece U-shaped in cross section to guard the front and sides, and having holes therethrough, and means to clamp said pieces together about a belt and pulley consisting of headed and L-shaped rods with threaded ends passing through the holes in said U-shaped pieces as far as permitted by the headed portions and having the threaded ends held in the ears on the back piece by clamp nuts threaded thereon.

6. A belt and pulley guard comprising, in combination, a support adapted to be rigidly secured to a machine to which the belt delivers power, a member to guard the lower free portion of the belt, said member being mounted upon said support for tilting adjustment relatively to the support about the axis of a pulley over which said belt passes, and a pulley guarding member removably mounted on said belt guarding member to permit relative tilting adjustment between said members.

7. A belt and pulley guard comprising, in combination, a member to guard the lower free portion of a belt, means to secure said member to a machine to which the belt delivers power, lugs on said member, and a draw cover having ledges to seat on said lugs to be slid into position to guard a pulley over which the belt passes.

8. A belt and pulley guard comprising, in combination, a protective guard for a belt, a member detachably secured thereto, to guard a pulley over which the belt passes, a support comprising means to be fastened eccentrically with respect to the pulley to a machine on which the pulley is mounted, and clamping means to fasten the protective belt guard and the support together constructed and arranged to permit adjustment of the guard and detachable member about the axis of the pulley.

9. A belt and pulley guard, as defined in claim 6, in which the draw member is made in two parts, one having an arcuate slot therein and the other being clamped thereto by a bolt passing through the slot, and one of said parts being formed and arranged to fit the shape of the machine about the pulley and always to occupy the same position while the remainder of the belt and pulley guard, including the other part of the draw member, is adjusted angularly about the axis of the pulley according to the inclination of the belt, such relative adjustment of the two parts of the draw member being made by means of the bolt-and-slot connection.

10. A belt and pulley guard comprising, in combination, a rear guard member, belt and pulley guarding means detachably carried thereby, and a support for said rear guard member having two pivotally-connected parts, one being constructed and arranged to be clamped to a machine and the other to said member, so that when said means is detached said member may be turned back out of the way without being removed.

11. A belt and pulley guard comprising, in combination, a plate to be fastened to a machine above a pulley thereon and behind a belt passing about the pulley, a belt-enclosing member U-shaped in cross-section detachably secured to the plate, and a pulley guard removably mounted on said plate.

12. A device of the class described comprising, a belt guard constructed and arranged to be adjusted angularly about the axis of a pulley over which passes the belt guarded thereby, and to have detachably secured thereto in any position of angular adjustment any one of a plurality of interchangeable pulley guards each fitted to occupy a single position with regard to a given machine, in combination with a pulley guard to be attached thereto and fitted according to the shape of the parts of a particular machine which are closely adjacent the pulley and which pulley guard occupies a single position relatively to such parts regardless of the angular position of the belt guard.

13. A device as defined by claim 12, in which the belt and pulley guards are constructed and arranged to be mounted on any one of a plurality of interchangeable supports, each of which is fitted to be secured to a different type of machine.

14. A belt and pulley guard comprising, in combination, a back piece provided with projecting ears, a front piece, and means to clamp said pieces together about a belt and pulley, said means consisting of rods each secured at one extremity to the front piece and having the opposite extremity held in the projecting ears formed on the back piece.

In testimony whereof I have signed my name to this specification.

NILS AMNEUS.